(12) United States Patent
Tiemann

(10) Patent No.: US 6,957,538 B2
(45) Date of Patent: Oct. 25, 2005

(54) COMBUSTION CHAMBER FOR A GAS TURBINE

(75) Inventor: Peter Tiemann, Witten (DE)

(73) Assignee: Siemens Aktiengesellschaft, Munich (DE)

(*) Notice: Subject to any disclaimer, the term of this patent is extended or adjusted under 35 U.S.C. 154(b) by 60 days.

(21) Appl. No.: 10/664,082

(22) Filed: Sep. 16, 2003

(65) Prior Publication Data

US 2004/0231333 A1 Nov. 25, 2004

(30) Foreign Application Priority Data

Sep. 17, 2002 (EP) .............................. 02020816

(51) Int. Cl.⁷ ................................. F02C 7/18
(52) U.S. Cl. ..................... 60/752; 60/755; 60/756; 239/132.3
(58) Field of Search ................. 60/737, 740, 742, 60/748, 752, 755, 756, 757, 758, 754, 760; 239/132.3

(56) References Cited

U.S. PATENT DOCUMENTS

| | | | | |
|---|---|---|---|---|
| 3,563,683 A | * | 2/1971 | Hess | 431/160 |
| 3,831,854 A | * | 8/1974 | Sato et al. | 60/756 |
| 4,216,908 A | * | 8/1980 | Sakurai et al. | 239/132.3 |
| 4,380,905 A | * | 4/1983 | Smart et al. | 60/756 |
| 5,581,999 A | * | 12/1996 | Johnson | 60/756 |
| 5,765,376 A | * | 6/1998 | Zarzalis et al. | 60/748 |
| 5,964,575 A | | 10/1999 | Marey | |
| 6,276,142 B1 | * | 8/2001 | Putz | 60/752 |
| 6,298,667 B1 | | 10/2001 | Glynn et al. | |
| 6,691,503 B2 | * | 2/2004 | Tiemann | 60/760 |

FOREIGN PATENT DOCUMENTS

EP 0 725 253 A2 8/1996
WO WO 97/14875 4/1997

* cited by examiner

Primary Examiner—Ted Kim

(57) ABSTRACT

The invention relates to a combustion chamber for a gas turbine having at least one closed-circuit-cooled burner insert which can be disposed in an inlet opening of the combustion chamber for the purpose of feeding and/or igniting a combustible gas/air mixture, and having an outlet opening.

The object of the present invention is therefore to create an arrangement enabling simplified manufacture and assembly to be achieved.

To achieve this object there is proposed according to the invention a combustion chamber for a gas turbine having at least one closed-circuit-cooled burner insert which can be disposed in an inlet opening of the combustion chamber for the purpose of feeding and/or igniting a combustible gas/air mixture, and having an outlet opening, at least one hot-gas-path component, specifically a component of an inner wall of the combustion chamber, forming on its outer side opposite the hot-gas-path side (55), in conjunction with a planar shaped element disposed thereabove, at least one channel which is fluidically connected to a coolant source on the feed side and to a channel arrangement of the burner insert on the discharge side.

21 Claims, 5 Drawing Sheets

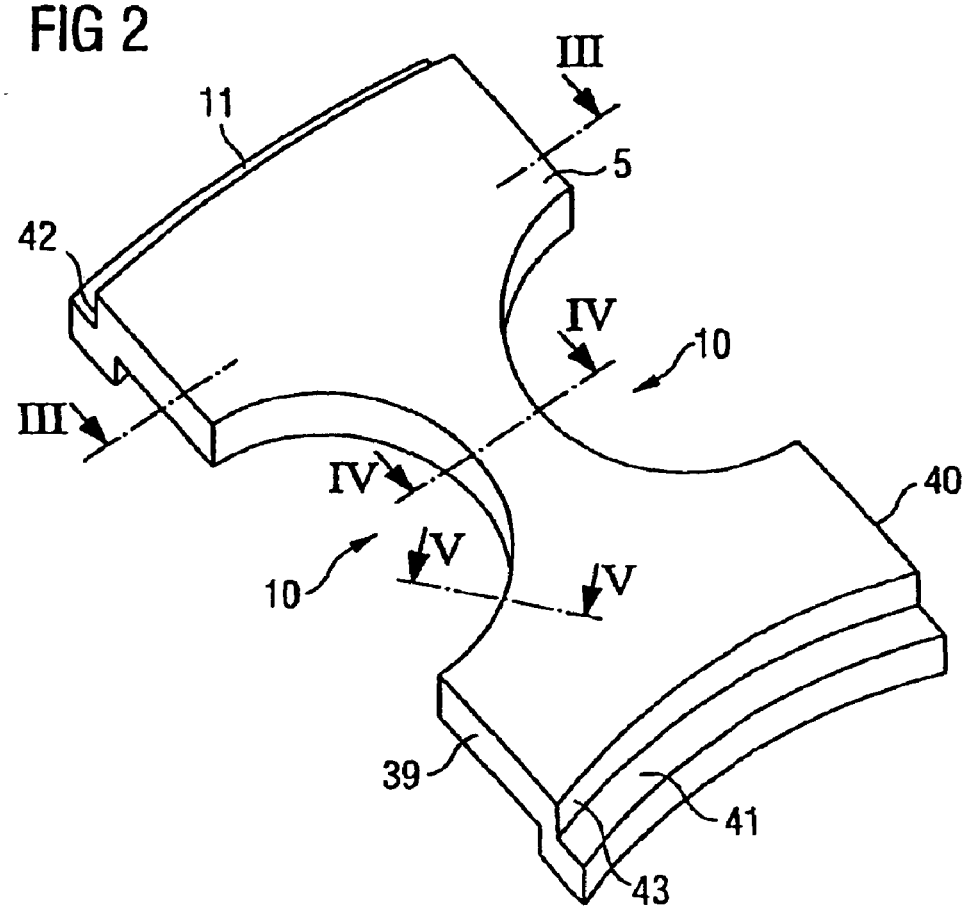
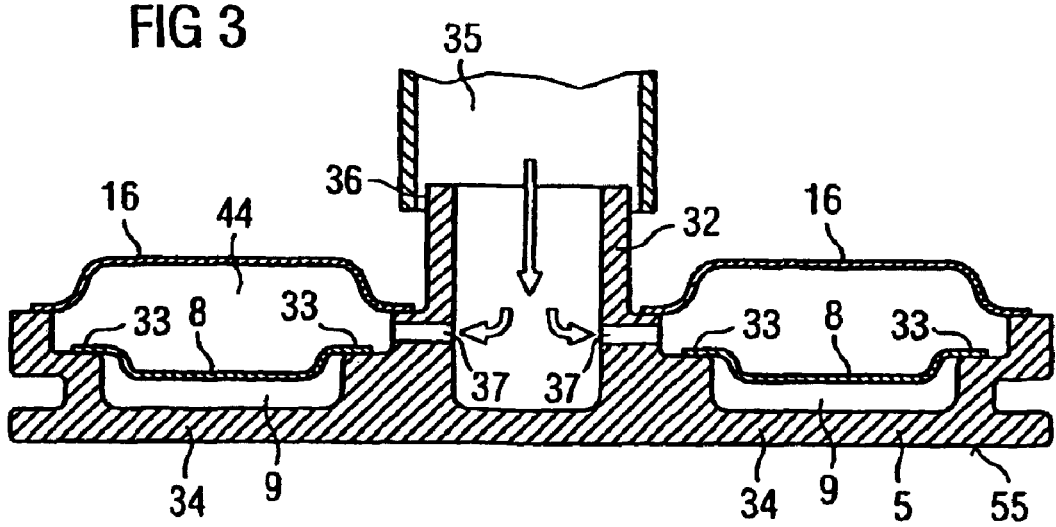

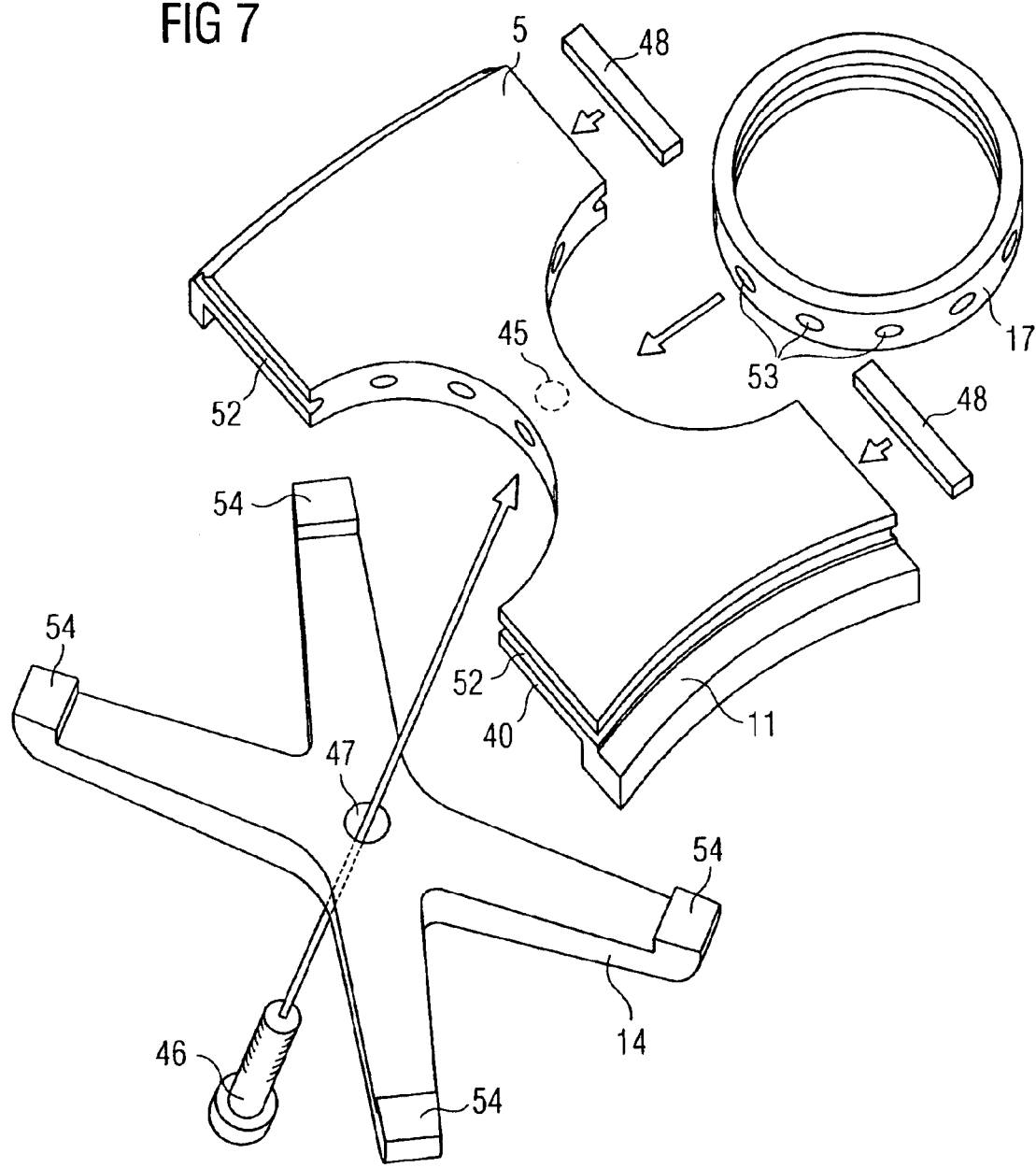

COMBUSTION CHAMBER FOR A GAS TURBINE

CROSS REFERENCE TO RELATED APPLICATIONS

This application claims priority of the European application No. 02020816.1 EP, filed Sep. 17, 2002 under the European Patent Convention and which is incorporated by reference herein in its entirety.

FIELD OF INVENTION

The invention relates to a combustion chamber for a gas turbine having at least one closed-circuit-cooled burner insert which can be disposed in an inlet opening of the combustion chamber for the purpose of feeding and/or igniting a combustible gas/air mixture, and having an outlet opening. The invention further relates to a burner insert for disposition on such a combustion chamber as well as a gas turbine having a combustion chamber of this kind.

BACKGROUND OF INVENTION

In addition to aircraft propulsion applications, gas turbines are widely used particularly for power generation, a combustible gas/air mixture being ignited in the combustion chamber and the energy liberated by the exothermic reaction producing an expansion and/or pressure increase. The resulting combustion gases are fed to a downstream flow path of a turbine in order to convert the energy of the gas into mechanical energy, specifically rotational energy. The mechanical rotational energy obtained thereby can be used e.g. for generating electricity or propelling a ship.

With regard to the design of combustion chambers for gas turbines, two different approaches are basically known. On the one hand the combustion chamber is of annular design, ignited gas/air mixture being introduced from at least one, generally a plurality of burners, into the annular combustion chamber in which is it evenly distributed and passes in an annular flow in the direction of the stationary and rotor blades disposed radially around a rotor shaft in the turbine's flow path. On the other hand, combustion chamber arrangements having a plurality of individual combustion chambers, so-called cans, are known.

In order to achieve a high degree of efficiency for such turbines, taking into account the extreme physical requirements, combustion chambers and also burner inserts are often cooled. To achieve this, the cooling is often extracted from an existing coolant reservoir which is at the same time also a component of the combusting mixture. Specifically air which has been condensed before being fed to the combustion chamber is used for this purpose. This air simultaneously serves as a coolant. In order not to significantly impair the efficiency of the gas turbine by tapping off the cooling air, closed-circuit cooling systems are being increasingly used in which the air is returned to the combustion chamber after having performed its cooling function. This enables loss of air to be prevented and also allows the heat energy absorbed by the cooling air to be fed back into the process.

The disadvantage with this prior art is that closed-circuit cooling systems of this kind are very expensive to design and involve complicated assembly.

SUMMARY OF INVENTION

The object of the present invention is therefore to create a closed-circuit-cooled combustion chamber allowing simplified manufacture and assembly.

To achieve this object there is proposed according to the invention a combustion chamber for a gas turbine having at least one closed-circuit-cooled burner insert which can be disposed in an inlet opening of the combustion chamber for the purpose of feeding and/or igniting a combustible gas/air mixture, and having an outlet opening, the burner insert being fixable by at least one planar baseplate mountable in the region of the inlet opening and forming part of an inner wall of the combustion chamber and with its outward-facing side simultaneously forming, in conjunction with a planar shaped element disposed thereabove, at least one channel which is fluidically connected to a coolant source on the feed side and to a channel arrangement of the burner insert on the discharge side.

The present invention is based on the knowledge that cooling hot-gas-path components increases their loading capacity and can reduce their aging. This can significantly impact on maintenance and operating costs, e.g. by enabling maintenance intervals to be lengthened or the overall efficiency of the turbine to be increased. With the present invention a component is therefore firstly proposed which is itself a constituent of the combustion chamber wall and forms an integral part of a cooling channel, thereby enabling an improved cooling effect to be achieved. Together with the shaped element, a cooling channel can therefore be implemented whose embodiment enables a largely demand-based cooling effect to be achieved. For example, because of the embodiment of the channel, the cooling effect can be increased in heavily loaded regions of the component, whereas it can be reduced in less stressed regions. In addition, a largely even stressing of the component can be achieved, enabling internal tensions in the component to be reduced. All in all, the component can therefore be more highly loaded. The solution according to the present invention can be used for both cans and annular combustion chambers.

It is further proposed that a retaining element is disposed on the outer side of the hot-gas-path component. The shaped element can be advantageously connected to the hot-gas-path component via the retaining element. For example, this enables the retaining element to be connected to the shaped element via an interference fit, it being able to form a movable support for implementing a sliding bearing arrangement at the sides. The retaining element is advantageously mounted on the component. However, it can also be mounted on other machine parts. The retaining element can be constituted by a clamp, a bracket or similar. However, it can also have retaining arms enabling the shaped element to be fixed to the component at a plurality of different locations.

It is additionally proposed that the retaining element can be centrally fixed to the baseplate by means of at least one mounting element. Any effect on the retaining element of loading-induced geometrical shape variations of the component and any positional variation relative to the component can be prevented. For this purpose the retaining element can advantageously be fixed centrally with respect to the component so that the relative position of the retaining element with respect to the component is maintained irrespective of its loading. The mounting element can be constituted, for example, by a bolt which can be driven into a corresponding threaded hole in the component. However, other known fixing means such as rivets, clamps or the like can also be used. Low assembly costs can be achieved. However, a plurality of mounting elements can also be provided.

It is proposed, moreover, that the retaining element has a bearing surface on its end areas. The retaining element can have mounting areas for mounting on the component and areas spaced apart therefrom for fixing the shaped part to the component. For this purpose, the retaining element can be implemented, for example, as a bar-shaped element with a central mounting possibility to the component and bearing surfaces on the two end areas. The bearing surfaces can be implemented such that a variation in the geometrical extension of the shaped element and/or of the component is not obstructed. However, the retaining element can also have an X-shaped or star-shaped structure, a central opening being provided for a mounting element. The retaining arms can have identical or different lengths. They can be aligned at identical or different angles to one another.

In a further embodiment it is proposed that the shaped element is covered by a cover element. The shaped element can thus be protected from environmental effects. For example, the cover element can be implemented as a metal plate. The cover element can additionally form, together with the shaped element, another channel which is connected e.g. to the first channel.

As part of an advantageous further development of the present invention it is proposed that the hot-gas-path component is a planar baseplate disposed in the region of the inlet opening and simultaneously forming part of the inner wall of the combustion chamber, said baseplate being the means whereby the burner insert can be fixed. This advantageously allows a saving of an additional wall necessary for flow separation in the area of the burner insert because of the closed-circuit-cooled design. Manufacturing complexity and costs can be reduced. In addition, assembly and maintenance costs can be reduced. The second wall required for the closed-circuit-cooled system is simultaneously formed by the baseplate in conjunction with the burner insert. The cooling air flowing through the channel can be returned to the combustion chamber, the energy absorbed by the cooling air being fed back into the process. The baseplate can be implemented e.g. as a casting. In addition, however, the baseplate can also be formed from another material such as a ceramic or the like. The baseplate can be part of the combustion chamber and can be implemented as a self-supporting wall element.

It is further proposed that the hot-gas-path component is a planar baseplate disposed in the region of the inlet opening and simultaneously forming part of the inner wall of the combustion chamber, said baseplate being the means whereby the burner insert can be fixed. It is precisely in the area of the inlet opening that a considerable design simplification and also a means of facilitating assembly and/or disassembly can be achieved. For example, the baseplate can have an essentially X-shaped structure with a cutout on opposing sides in order to semi-enclose a burner insert in each case, so that two adjacent baseplates can fully circumferentially enclose a burner insert. This enables the large number of different components to be reduced while at the same time enabling a high loading capacity to be achieved.

It is advantageously proposed that the baseplate has a lateral cutout for accommodating the burner insert. The lateral cutout can accommodate the burner insert, thereby enabling assembly to be simplified. In addition, a connection between the channel and the channel arrangement of the burner insert can be established by, for example, the cutout having openings connected to the channel and via which the cooling air can be fed to the burner insert. A lead-through of the burner insert from the exterior of the turbine into the combustion chamber can be achieved.

It is further proposed that the baseplate has at least one mounting flange for mounting on the inlet opening. The baseplate can be advantageously mounted on the inlet opening using known fixing means such as bolts, rivets and the like. Together with a correspondingly implemented mating surface on the inlet opening, a high-loading-capacity sealing function can be achieved with the flange. If necessary, a washer or shim can also be easily provided as a means of increasing the sealing effect and/or compensating for distortions or unevennesses of the sealing surfaces. Moreover, a high mechanical loading capacity can be achieved by the embodiment as a flange.

It is additionally proposed that a sealing element can be disposed between the mounting flange and the mounting area of the inlet opening, advantageously enabling unevennesses in the surfaces to be connected to be compensated. The sealing element additionally provides an adjustment particularly in the event of changes in operation, if the areas to be connected change differentially in terms of their geometrical position and extent.

In addition, it is proposed that the sealing element is of annular design, enabling it to be advantageously handled as a one-piece component. Assembly costs can be reduced.

In a further embodiment it is proposed that the cutouts of two adjacently disposed baseplates form an opening enclosing the burner insert. Advantageously, baseplates can be disassembled individually without it being necessary to disassemble the burner insert. Simple assembly can be achieved particularly if the baseplates are disposed in an annular combustion chamber.

In a further embodiment according to the invention it is proposed that a connecting collar can be disposed between the baseplate and the burner insert. A reliable sealing effect can be advantageously achieved with the connecting collar, while at the same time enabling tolerances of the surfaces to be sealed to be compensated.

It is further proposed that the connecting collar is made from two axially extending half shells, enabling the connecting collar to be advantageously disposed on a burner insert whose output end overhangs the internal diameter of the collar.

It is additionally proposed that the connecting collar has at least one radial bore connected at one end to the channel and with its opposite end opening into an annular groove provided on the internal circumference of the collar. This advantageously enables the coolant flowing through the channel to be returned to the gas/air mixture via the bore and the annular groove, thereby preventing any loss.

It is further proposed that the connecting collar has at least one radial bore connected at one end to a channel formed by the shaped element and the cover element and with its opposite end opening into an annular groove provided on the internal circumference of the collar. This advantageously enables cooling of the burner insert via the connecting collar to be increased. It is additionally possible to adjust the cooling effect for the burner insert according to demand. This enables thermal decoupling between burner insert and baseplate to be improved.

In order to be able to return the cooling fluid to the process after it has flowed through the cooling channels, it is proposed that the annular groove is fluidically connected to the channel arrangement of the burner insert. The energy absorbed by the cooling fluid can therefore be advantageously returned to the process. A high turbine efficiency can be achieved. In addition, any energy input at any other unwanted location, e.g. the turbine casing, can be prevented.

In a further embodiment it is proposed that a sealing element fixable by means of the connecting collar can be disposed between adjoining sides of adjacently disposed baseplates. Load-dependent geometrical changes in the baseplates can be advantageously compensated without significantly affecting the leak-tightness of the arrangement. In order to improve a sealing effect between adjacent baseplates of a large combustion chamber, a groove in which the sealing element can be disposed can be provided on each of the adjacently adjoining end faces of the baseplates. Particularly with large combustion chambers a good sealing effect can be advantageously achieved using a plurality of baseplates.

With the invention there is additionally proposed a burner insert for disposition in an opening of the abovementioned combustion chamber, having a first area connected to a combustion chamber inner wall and a second area detachably connected to the first area and facing the combustion chamber, the second area being connected via the baseplate to the inlet opening of the combustion chamber. The second area of the burner insert is advantageously demountable towards the inside of the combustion chamber without the combustion chamber having to be time-consumingly dismantled. Maintenance costs can therefore be further reduced.

With the invention there is also proposed a gas turbine with a blade arrangement consisting of a flow channel with rotor blades disposed on a rotor and with fixed stationary blades, a combustion chamber according to the invention, as described above, being disposed upstream of the blade arrangement in the flow direction of a gas flow. Maintenance time and cost can be advantageously reduced.

It is further proposed that a burner insert as described above is disposed on the combustion chamber of the turbine. This enables the heavily stressed areas of the burner inserts to be easily accessible for maintenance, e.g. by means of replacement if a wear limit or a maximum lifetime has been reached, thereby obviating the need to replace the complete burner insert. Replacement costs can be saved.

BRIEF DESCRIPTION OF THE DRAWINGS

Further details, features and advantages of the invention are detailed in the following description of exemplary embodiments. Essentially identical components are designated by the same reference characters. For identical features and function, also refer to the description of the exemplary embodiment in FIG. 1.

FIG. 2 shows a perspective, schematic view of a baseplate according to the invention, FIG. 3 shows a section through the baseplate in FIG. 2 along a line III—III, FIG. 6 shows a schematic exploded view of the baseplate in FIG. 2 with sealing means and FIG. 7 shows an exploded view of the baseplate in FIG. 6 with an additional retaining element.

DETAILED DESCRIPTION OF INVENTION

Figure 1:
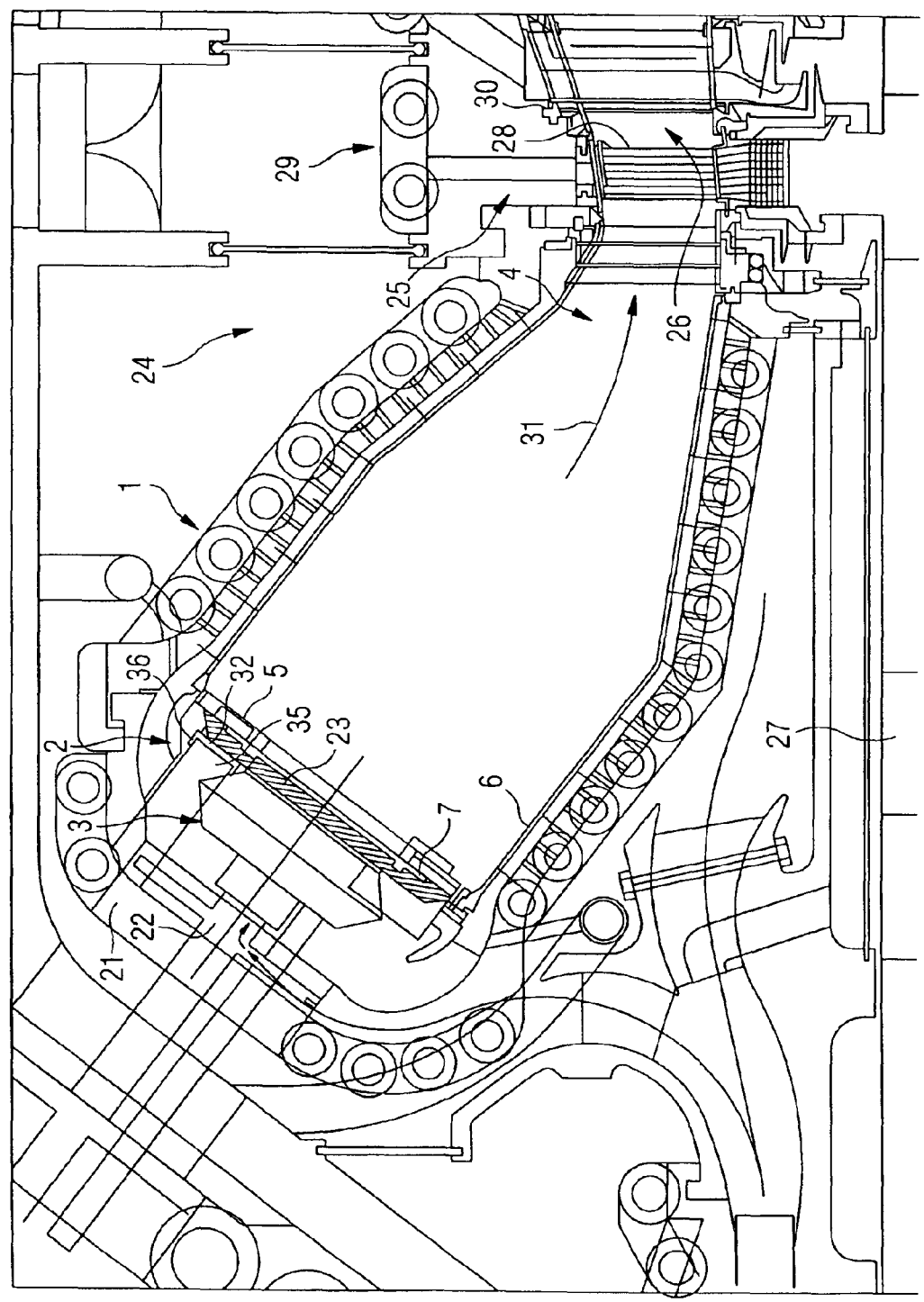
FIG. 1 shows a sectional view of a combustion chamber according to the invention with a turbine detail.

FIG. 1 shows a combustion chamber 1 for a gas turbine 24 having one closed-circuit-cooled burner insert 3 which can be disposed in an inlet opening 2 of the combustion chamber 1 for the purpose of feeding and/or igniting a combustible gas/air mixture, and having an outlet opening 4. The burner insert 3 can be fixed by means of a planar baseplate 5 which can be mounted in the area of the inlet opening 2. Together with its side 55, the baseplate 5 simultaneously forms part of an inner wall 6 of the combustion chamber 1. The outward facing side 7 of the baseplate 5 forms, in conjunction with a planar shaped element 8 disposed thereabove, two channels 9 which are fluidically connected to a coolant source (not shown) on the feed side and to a channel arrangement of the burner insert 3 on the discharge side (FIG. 3).

The shaped element 8, here implemented as a sheet-metal part and also referred to as a cooling baffle, forms closed channels 9 in conjunction with cutouts 34 made in the baseplate 5. For this purpose the cooling baffle 8 is welded to the baseplate 5 in the edge areas. The baseplate 5 additionally has a socket 32 which can be connected to a pipe 35 to form a pipe fitting 36. Alternatively, however, a plurality of sockets 32 can also be provided if this is meaningful from a design viewpoint, and these can be detachable from the baseplate 5.

Above the cooling baffle 8 there is additionally disposed a cover plate 16 which forms channels 44 with the cooling baffle 8. For this purpose the cover plate 16 is likewise welded to the baseplate 5 at its sides. The interior of the socket 32 is connected via channels 37 to the channels 44 which are in turn connected to the channels 9. The channels 9 are connected to a channel system (not shown) of the burner insert 3 via openings 38.

FIG. 2 is a schematic perspective view of the baseplate 5 according to the invention which is provided in this embodiment for an annular combustion chamber. The baseplate 5 has two parallel longitudinal sides 39, 40 on each of which a cutout 10 is provided centrally so that an essentially X-shaped structure is formed. In the longitudinal direction there are provided, on the transverse sides 42, 43, flanges 11, 41 via which the baseplate 5 can be connected to the inlet opening 2 of the combustion chamber 1. The transverse sides 42, 43 and also the flanges 11, 41 are curved so that plurality of baseplates 5 can be disposed side-by-side adjacently to one another on the annular combustion chamber 1, the cutouts 10 of two adjacent baseplates 5 thus forming an opening for accommodating a burner insert 3.

Figure 4:
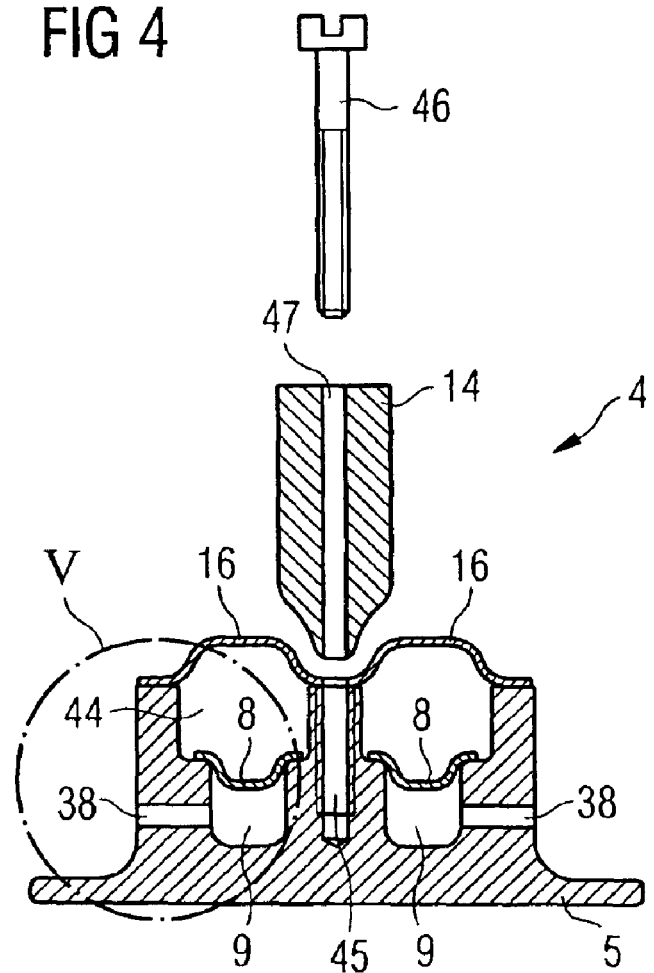
FIG. 4 shows a section through the baseplate in FIG. 2 along a line IV—IV.

FIG. 4 shows a section through the baseplate 5 at the level of the two cutouts 10. To preserve the available cross-section, the vertical dimensions of the walls of the channels 9, 44 are made correspondingly larger. As this figure also shows, the channels 9 are connected to the outside via openings 38. The other channel 44 in which the cover plate 16 is provided above the cooling baffle 8 is formed via the shaped element 8.

Figure 5:
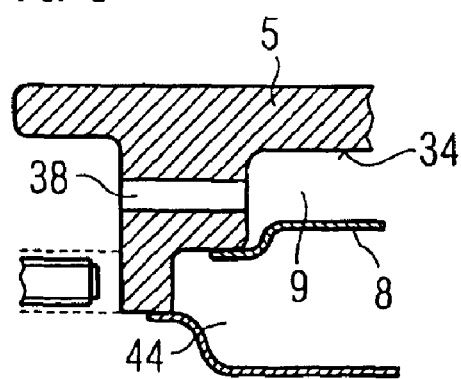
FIG. 5 shows a section through an area of the baseplate in FIG. 2 along a line V—V.

A threaded hole 45 is provided centrally on the baseplate 5. A web-shaped retaining element 14 having a bore 47 is bolted down on the threaded hole 45 by means of a bolt 46. FIG. 5 shows in enlarged form the exit area of the coolant from the baseplate 5 in the direction of the burner insert 3. In this embodiment the baseplate 5 is implemented as a casting.

Figure 6:
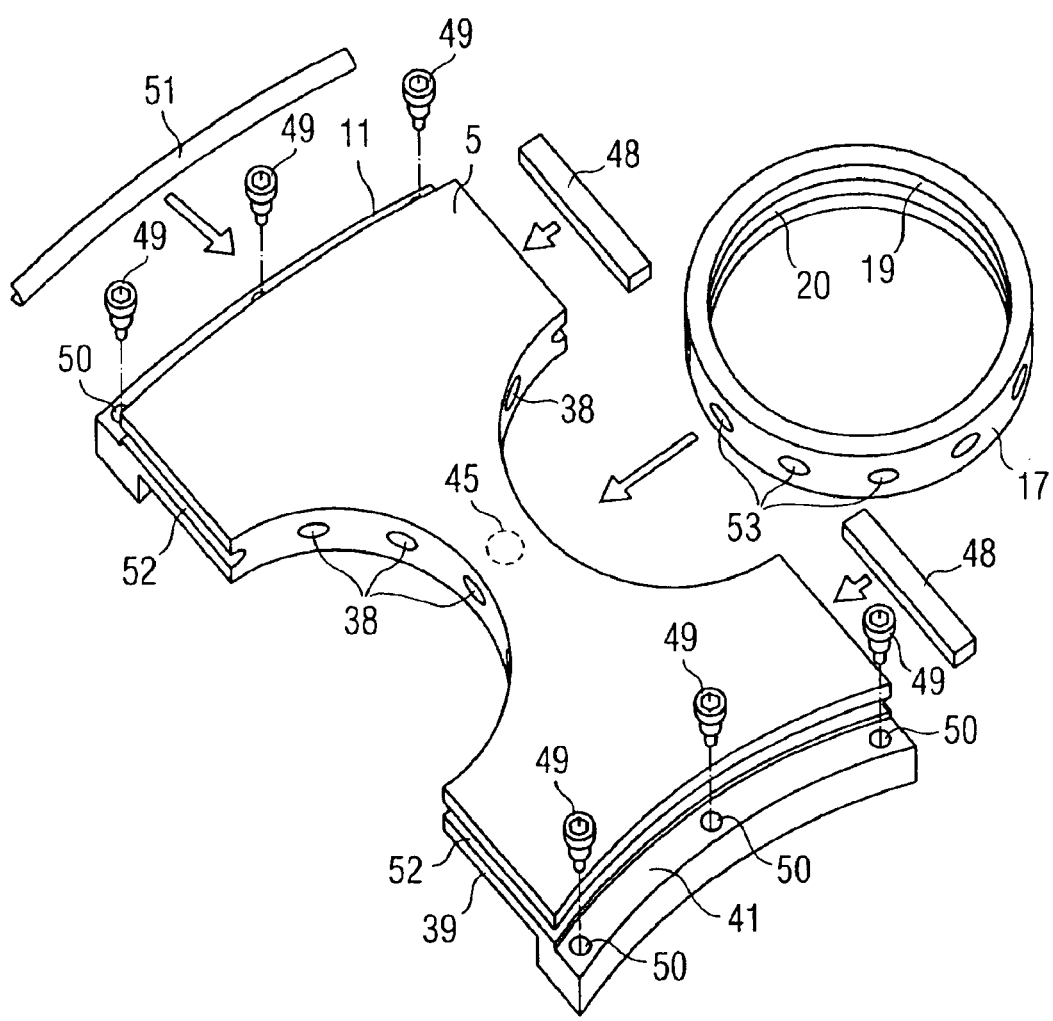

FIG. 6 is an exploded view schematically illustrating an assembly option for the baseplate 5. The flanges 11 and 41 are provided with bores 50 into which bolts 49 can be inserted. The baseplate 5 can be mounted on the inlet opening 2 by means of the bolts 49. There is provided a sealing element 51 between the flanges 11, 41 and the respective mating surfaces of the inlet opening 2 in each case. In the longitudinal sides 39, 40 there are provided in each case grooves 52 extending from the cutouts 10 to the transverse sides 42, 43 and into which the sealing elements 48 can be inserted.

A connecting collar 17 formed from two half shells can be inserted into the annular openings formed by the cutouts 10 of adjacent baseplates 5. The connecting collar 17 has bores 53 which are connected to an annular groove 20 on the inner circumference 19 of the collar 17. The bores 53 are distributed around the circumference of the collar 17 is such a way that, when installed, they are aligned with corresponding openings 38 in the baseplate 5. The burner insert 3 can be inserted into the collar 17, the annular groove 20 being connectable to a channel system (not shown) for closed-circuit cooling of the burner insert 3. Thus cooling air which has flowed through the channel system, formed from channels 9, 44 of the baseplate 5 can be fed to the combustion chamber 1. The sealing elements 48 can be fixed above the connecting collar 17.

FIG. 7 is a schematic exploded view illustrating the disposition of an alternative, X-shaped retaining element 14 having a central bore 47 via which it can be fastened to the threaded hole 45 of the baseplate 5 by means of a bolt 46. At its ends, the retaining element 14 has bearing surfaces 54 which seat on the outward facing surface of the baseplate 5 at its corner areas. This enables deflections of the baseplate 5 due to thermal effects to be reduced by the retaining element 14, it having been found advantageous that the retaining element 14 is connected to the baseplate 5 at one point only and is largely thermally decoupled therefrom due to the small bearing surfaces. In the event of changes in the geometrical dimensions because of thermal effects, the bearing surfaces 54 can thus slide over the corresponding surface areas so that corresponding compressive and/or tensile forces can be prevented.

The position of the retaining element 14 relative to the baseplate 5 is largely independent of the loading of the baseplate 5.

FIG. 1 shows that the burner insert 3 is of two-part design. It has a first area 22 which is connected to a combustion chamber outer wall 21. The first area 22 of the burner insert 3 is detachably connected to a second area 23 which is coupled to the inlet opening 2 of the combustion chamber 3 via the baseplate 5. By removing the collar 17, the area 23 of the burner insert 3 can be advantageously taken out via the combustion chamber. To replace the highly thermally stressed area 23 of the burner insert 3 it is therefore no longer necessary to completely dismantle the burner insert 3. Instead the highly stressed parts can be simply replaced through the combustion chamber 1.

During operation, a combustible gas/air mixture is fed via the burner insert 3 into the combustion chamber 1 where it is ignited. The resulting combustion gases flow in direction 31 into the blade arrangement 25 of the gas turbine 24. This consists of a flow path 26 with rotor blades 28 disposed on a rotor 27 and fixed stationary blades 30. In this section the energy stored in the combustion gases is converted to rotational energy among other things.

The subject matter of the present invention additionally allows simple dismantling of baseplates 5 by first undoing bolts 49 and then screw connections (not shown) of the connecting dollar 17 to the baseplate 5. The seal 48 is then dismounted. The baseplate 5 complete with all its attachments can now be removed. Assembly is performed in the reverse sequence.

The exemplary embodiments illustrated in the figures are used only by way of explanation of the invention and are not to be taken in a limiting sense. Thus in particular the baseplate, the retaining element and also the mounting, etc. can vary.

What is claimed is:

1. A combustion chamber for a gas turbine, comprising:
   a closed-circuit-cooled burner insert which can be disposed in an inlet opening of the combustion chamber for the purpose of feeding and/or igniting a combustible gas/air mixture;
   an outlet opening;
   a hot-gas-path component;
   a sealing element that can be disposed between a mounting flange and a mounting area of the inlet opening; and
   a planar shaped element disposed above and connected to the hot-gas-path component,
   wherein the hot-gas-path component and the planar shaped element collectively form a channel which is fluidically connected to a coolant source on a first side and to a closed circuit cooling channel system of the burner insert on a second side.

2. The combustion chamber according to claim 1, wherein a retaining element is disposed on the outer side of the hot-gas-path component.

3. The combustion chamber according to claim 2, wherein the retaining element can be centrally fixed to the baseplate by means of at least one mounting element.

4. The combustion chamber according to claim 2, wherein the retaining element has a bearing surface on its end areas.

5. The combustion chamber according to claim 3, wherein the retaining element has a bearing surface on its end areas.

6. The combustion chamber according to claim 1, wherein the planar shaped element is covered by at least one cover element.

7. The combustion chamber according to claim 1, wherein the hot-gas-path component is a planar baseplate disposed in the area of the inlet opening, simultaneously forming part of the inner wall of the combustion chamber and being the means whereby the burner insert can be fixed.

8. The combustion chamber according to claim 7, wherein the baseplate has a lateral cutout for accommodating the burner insert.

9. The combustion chamber according to claim 8, wherein the cutouts of two adjacently disposed baseplates form an opening enclosing the burner insert.

10. The combustion chamber according to claim 7, wherein the baseplate has the mounting flange for mounting on the inlet opening.

11. The combustion chamber according to claim 7, wherein a connecting collar can be disposed between the baseplate and the burner insert.

12. The combustion chamber according to claim 11, wherein the connecting collar is formed from two axially extending half shells.

13. The combustion chamber according to claim 11, wherein the connecting collar has at least one radial bore which is connected at one end to the channel with its opposite end opening into an annular groove on the inner circumference of the connecting collar.

14. The combustion chamber according to claim 13, wherein the annular groove is fluidically connected to the channel arrangement of the burner insert.

15. The combustion chamber according to claim 11, wherein the connecting collar has at least one radial bore which is connected at one end to the channel with its opposite end opening into an annular groove on the inner circumference of the connecting collar.

16. The combustion chamber according to claim 11, wherein a sealing element, which can be fixed by means of the connecting collar, can be disposed between adjoining sides of two adjacently disposed baseplates.

17. The combustion chamber according to claim 1, wherein the sealing element is of annular form.

18. The combustion chamber according to claim 1, wherein the hot-gas-path component is a component of an inner wall of the combustion chamber.

19. A burner insert adapted for disposition in an inlet opening of a combustion chamber comprising:
   a first area connected to an outer wall of the combustion chamber; and
   a second area detachably connected to the first connected area and facing the combustion chamber, wherein the second area is connected to an inlet opening of the combustion chamber via the baseplate,
   wherein the combustion chamber comprises:
   a closed-circuit-cooled burner insert which can be disposed in the inlet opening of the combustion chamber for the purpose of feeding and/or igniting a combustible gas/air mixture;
   an outlet opening;
   a hot-gas-path component; and
   a sealing element that can be disposed between a mounting flange and a mounting area of the inlet opening; and
   a planar shaped element disposed above and connected to the hot-gas-path component,
   wherein the hot-gas-path component and the planar shaped element collectively form a channel which is fluidically connected to a coolant source on a first side and to a closed circuit cooling channel system of the burner insert on a second side.

20. A gas turbine with a blade arrangement comprising:
   a flow path with rotor blades disposed on a rotor;
   a plurality of fixed stationary vanes; and
   a combustion chamber disposed upstream of the blade arrangement in the flow direction of a gas flow,
   wherein the combustion chamber comprises:
   a closed-circuit-cooled burner insert which can be disposed in an inlet opening of the combustion chamber for the purpose of feeding and/or igniting a combustible gas/air mixture;
   an outlet opening;
   a hot-gas-path component;
   a sealing element that can be disposed between a mounting flange and a mounting area of the inlet opening: and
   a planar shaped element disposed above and connected to the hot-gas-path component,
   wherein the hot-gas-path component and the planar shaped element collectively form a channel which is fluidically connected to a coolant source on a first side and to a closed circuit cooling channel system of the burner insert on a second side.

21. The gas turbine according to claim 20, with a burner insert adapted for disposition in an inlet opening of a combustion chamber,
   wherein the burner inlet comprising:
   a first area connected to an outer wall of the combustion chamber; and
   a second area detachably connected to the first area and facing the combustion chamber, wherein the second area is connected to the inlet opening of the combustion chamber via the baseplate.

* * * * *